US006081641A

United States Patent [19]

Chen

[11] Patent Number: 6,081,641

[45] Date of Patent: Jun. 27, 2000

[54] THERMAL COMPENSATED FUSED-FIBER DENSE WAVELENGTH DIVISION MULTIPLEXER

[75] Inventor: Peter Z. Chen, Fremont, Calif.

[73] Assignee: Applied Fiber Optics, Inc., Fremont, Calif.

[21] Appl. No.: 08/962,862

[22] Filed: Nov. 3, 1997

[51] Int. Cl.[7] .......................................... G02B 6/26

[52] U.S. Cl. .......................................... 385/43; 359/494

[58] Field of Search .......................................... 385/43, 37, 48, 385/51, 31, 11, 34, 15, 24, 39; 372/703, 6, 19, 94, 27; 359/494, 123, 110, 124, 127, 161, 121, 181, 189, 191, 156; 250/225, 227.17

[56] References Cited

U.S. PATENT DOCUMENTS

| | | | |
|---|---|---|---|
| 5,285,305 | 2/1994 | Cohen et al. | 359/110 |
| 5,555,330 | 9/1996 | Pan et al. | 385/39 |
| 5,588,013 | 12/1996 | Reitz et al. | 372/19 |
| 5,642,447 | 6/1997 | Pan et al. | 385/31 |
| 5,642,448 | 6/1997 | Pan et al. | 385/31 |
| 5,652,819 | 7/1997 | Orazi | 385/51 |
| 5,673,129 | 9/1997 | Mizrahi | 359/124 |
| 5,809,190 | 9/1998 | Chen | 385/43 |

FOREIGN PATENT DOCUMENTS

| | | | |
|---|---|---|---|
| 0 525 743 | 2/1993 | European Pat. Off. | G02B 6/28 |
| 97/26572 | 7/1997 | WIPO | G02B 6/16 |

*Primary Examiner*—Akm E. Ullah
*Attorney, Agent, or Firm*—Skjerven, Morrill, MacPherson, Franklin & Friel LLP; Tom Chen

[57] ABSTRACT

A structure and method are provided to compensate for temperature changes on wavelength shifting in DWDM by reducing tension in a fused-fiber DWDM when temperature increases and increasing tension when temperature decreases, thereby stabilizing wavelength shifts throughout the range of operating temperatures. The DWDM, which is enclosed by a protective package in some embodiments, is connected to substrates of different thermal expansion coefficients, such that the fused-fiber portion of the DWDM exhibits negative thermal expansion, i.e. contracts when temperature increases and expands when temperature decreases. As a result, temperature-induced wavelength shifts are minimized due to a passive thermal compensation, which can be easily adjusted. In other embodiments, twisting the fused-fiber portion of the DWDM to obtain optimum phase matching minimizes the polarization-dependent losses in the incoming light.

40 Claims, 8 Drawing Sheets

60
61
62
63
61
66
65
66
67
67
64

THERMAL COMPENSATED FUSED-FIBER DENSE WAVELENGTH DIVISION MULTIPLEXER

BACKGROUND OF THE INVENTION

1. Field of the Invention

The present invention relates to fused-fiber wavelength division multiplexers (WDM) and, in particular, to dense WDM (DWDM).

2. Discussion of the Related Art

With existing fiber optic networks, there is often the need to increase information transmission capacity. However, both physical and economic constraints can limit the feasibility of increasing transmission capacity. For example, installing additional fiber optic cable to support additional wavelengths can be cost prohibitive, and electronic system components may impose physical limitations on the amount of information that can be transmitted. The use of wavelength division multiplexers (WDMS) provides a simple and economical way to increase the transmission capacity of fiber optic communication systems by allowing multiple wavelengths to be transmitted and received over a single optical fiber.

WDMs can be manufactured using, for example, biconical tapered fusion (BTF) technology. Typically, two optical fibers are fused together along an interior portion to form a fused-fiber coupler, such that light of two wavelengths (i.e., 1310 nm and 1550 nm) entering the inputs of the first and second fibers, respectively, are multiplexed onto a single fiber, transmitted, and then demultiplexed onto the two outputs of the first and second fibers. Light at 1550 nm is particularly desirable because minimal absorption is exhibited by optical fibers around this wavelength. Commercially available fused-fiber WDMs typically also couple and decouple light at 1550 nm and 980 nm and at 1550 nm and 1480 nm.

The principles of WDM can be extended to further increase data transmission capability by coupling additional discrete wavelengths or channels onto a single fiber using a more recent technology known as dense WDM (DWDM). Fused-fiber DWDMs may couple, for example, 8, 16, or even 32 discrete communication channels onto a single optic fiber. However, because the usable bandwidth of the light is limited, increasing the number of wavelengths necessarily results in smaller channel separation between the discrete wavelengths. In general, smaller channel spacing can be achieved by increasing the length of the fused portion of a fused-fiber DWDM. However, decreasing channel spacing presents different types of problems, such as increased sensitivity to temperature fluctuations.

As temperature increases in the fused-fiber WDM, the refractive index of the fused-fiber portion increases due to the refractive index dependence on temperature of fused silica, which is approximately $6\times10^{-6}/°$ C. This causes a longer optical path inside the coupling region of the WDM, and therefore, shifts the peak transmission wavelengths toward shorter wavelengths, thereby decreasing the channel spacing or wavelength separation capability of the WDM. These temperature-induced shifts normally do not adversely affect conventional WDMs, which typically have channel spacings of 50 nm or more. However, with DWDMs, typically having channel spacings of 1 nm or less, such wavelength shifts can pose significant problems with transmission performance.

One method to reduce temperature-induced wavelength shifts is to use a thermal-isolated device containing an electric cooler/heater with a temperature feedback element to actively maintain a constant temperature of the fused-fiber DWDM structure. However, such a device adds size, as well as cost and complexity, to the multiplexer, and thus the fiber optic communication system. Furthermore, over a wide temperature range, such as –40° C. to approximately 80° C., the device's ability to maintain a constant temperature decreases.

Accordingly, a structure and method are desired for controlling temperature-induced effects in fused-fiber DWDMs which overcomes the disadvantages discussed above with conventional devices.

SUMMARY OF THE INVENTION

The present invention provides a structure and method to compensate for temperature-induced wavelength shifts in fused-fiber dense wavelength division multiplexers (DWDMS) by relieving tension to the DWDM when temperature increases and increasing tension when temperature decreases. Polarization-dependent losses can also be minimized by twisting the fused-fiber portion of the DWDM to attain optimum phase matching between two incoming light sources.

A conventional fused-fiber DWDM is secured to a first substrate, where the fused-fiber coupling portion of the DWDM is under tension. The amount of tension is adjusted to set the desired pass band wavelengths of the incoming light. In some embodiments, the tension is applied prior to securing the DWDM to the first substrate; while in other embodiments, tension is applied afterwards by bending the first substrate together with the fused-fiber portion of the DWDM. The first substrate is then connected to a second substrate at a plurality of mounting points in such a manner that the distance between mounting points decreases when temperature increases, which releases tension in the DWDM. The second substrate can be a single substrate or a composite of two or more substrates, where the second substrate has a thermal expansion coefficient higher than that of the first substrate.

Due to the different rates of thermal expansion, the fused-fiber portion of the DWDM expands and contracts with changes in temperature, which shifts the wavelength peak to shorter and longer wavelengths, respectively. Thus, when temperature increases, this passive thermal compensation (PTC) relieves tension in the DWDM to shift the wavelength towards higher wavelengths, which counteracts temperature-induced wavelength shifts toward shorter wavelengths.

Tension can also released as temperature increases by bending the middle portion of the DWDM in some embodiments, while bending the end portions of the DWDM in other embodiments. The amount of compensation, which depends on the amount of tension released, can be easily adjusted by changing the connection points of the substrates, the length at which the two substrates are connected, the relative thermal expansion coefficients of the substrates, or the thickness and length of the substrates, depending on the particular embodiment.

In other embodiments, where tension is applied to the DWDM by bending the DWDM and first substrate, the first substrate is inserted into a bent second substrate. The second substrate is bent more than the first substrate so that the second substrate maintains the desired bend in the first substrate without physical connections such as by epoxy. The second substrate also has a thermal expansion coefficient higher than the first substrate, which results in the first substrate unbending and releasing tension as temperature increases to provide the desired passive thermal compensation.

Accordingly, temperature-induced wavelength shifting in fused-fiber DWDMs can be quickly and easily compensated for by increasing or decreasing the amount of tension in the fused-fiber coupling portion of the DWDM using passive thermal compensation.

This invention will be more fully understood in light of the following detailed description taken together with the accompanying drawings.

BRIEF DESCRIPTION OF THE DRAWINGS

Use of the same reference numbers in different figures indicates similar or like elements.

DETAILED DESCRIPTION

The present invention discloses a structure and method to compensate for shifts in the peak wavelength, or equivalently in the refractive index, caused by temperature variations in fused-fiber dense wavelength division multiplexers (DWDMs) using passive thermal compensation (PTC) techniques.

Figure 1:
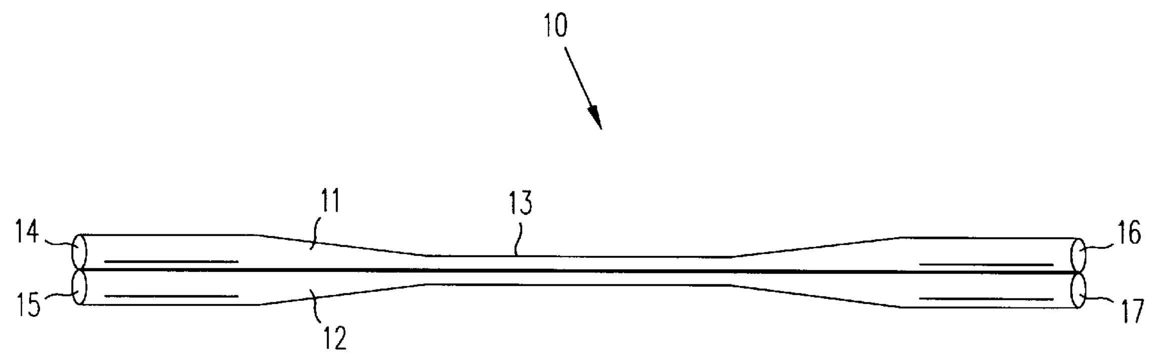
FIG. 1 is a diagram of a conventional fused-fiber WDM.

A typical fused-fiber WDM 10, also known as a biconical tapered fusion (BTF) coupler, is shown in FIG. 1. Fused-fiber WDM 10 can be formed by heating and axially stretching two optic fibers 11 and 12 and fusing the two fibers together along a predetermined length to form a coupling region 13. Broadband light at two wavelengths, entering WDM 10 at input ports 14 and 15, couple onto and travel along fused coupling region 13, and then decouple and exit WDM 10 at output ports 16 and 17, respectively.

Figure 2:
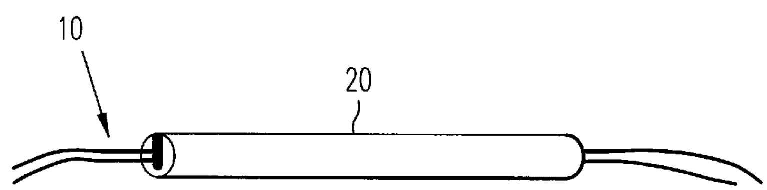
FIG. 2 is a diagram of a WDM secured within a sleeve.
Figure 3:
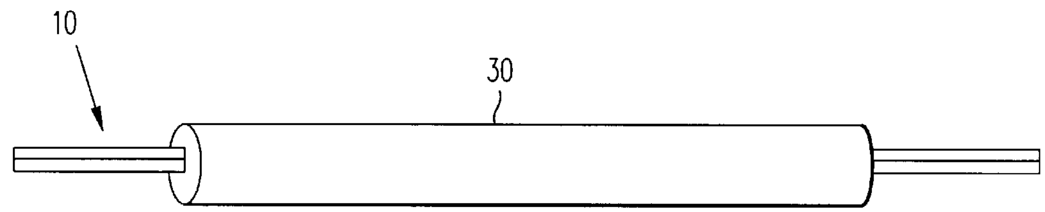
FIG. 3 is a diagram of the structure of FIG. 2 enclosed within a protective package.

To provide mechanical protection, as well as thermal stabilization, WDM 10 is typically placed or secured within a quartz sleeve substrate 20, as shown in FIG. 2. Thermal stabilization is achieved because quartz has a thermal expansion coefficient similar to that of the silica fiber. WDM 10 and quartz sleeve 20 can then be placed inside a sealed package 30, typically metal, to increase mechanical and humidity protection for the fused-fiber multiplexer, as shown in FIG. 3.

Figure 4A:
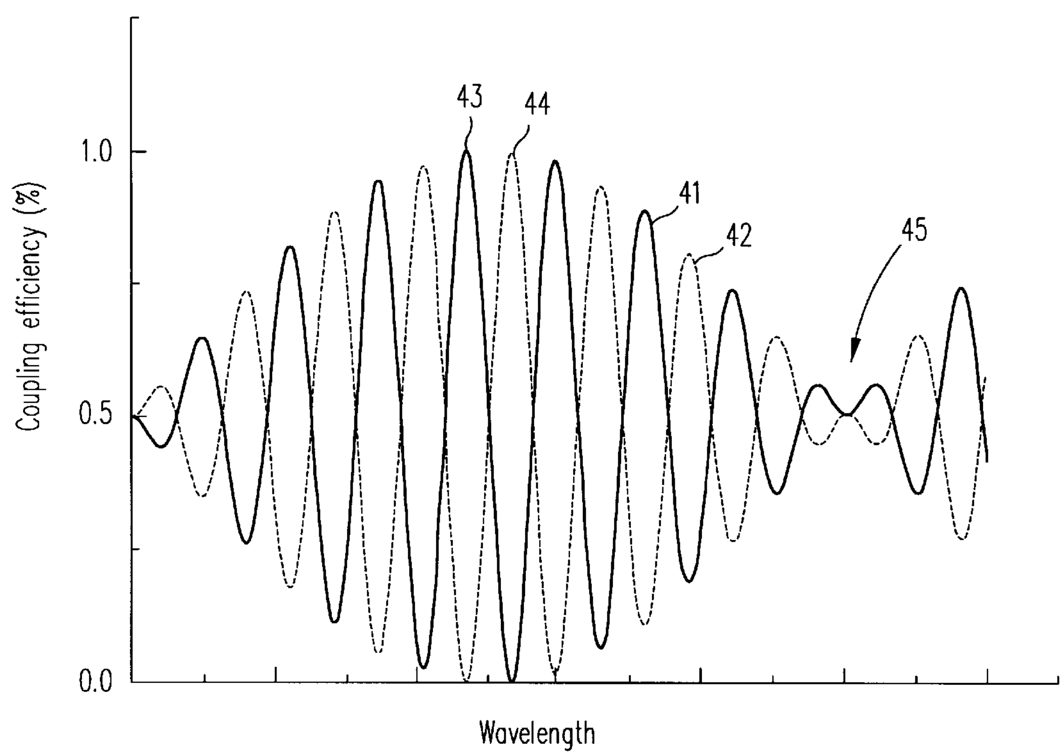
FIG. 4A is a graph of a typical spectrum of the output light from a WDM.

FIG. 4A shows a typical spectrum of the output light from a WDM after traveling through the fused-fiber coupling region (for example, from output ports 16 and 17 of FIG. 1, after traveling through coupling region 13 of WDM 10). Light from one output is shown by solid line 41, and the simultaneous light from the other output is shown by dashed line 42. The transmission curve consists of alternating peaks and nulls which result from the transverse mode interference in the coupling region. The channel spacing, defined as the wavelength spacing between the peak 43 of a wavelength from one output port and the peak 44 of the nearest wavelength from a second output port, is the wavelength separation (or combination) capability of the WDM. The channel spacing of most commonly available commercial fused-fiber WDMs are typically 50 nm or more, i.e., 70 nm for a 1480 nm/1550 nm pair, 240 nm for a 1310 nm/1550 nm pair, and 570 nm for a 980 nm/1550 nm pair.

However, the wavelength peaks and pass bands shift as the temperature of the WDM changes due to the temperature dependence of the refractive index of fused silica ($\sim 6\times 10^{-6}/°$ C.). For example, experiments have shown that the wavelength peaks in fused-fiber WDMs change with temperature at a rate of approximately 0.012 nm/° C. for light at wavelengths around 1550 nm. Thus, for a 100° C. change in temperature, the shift will be about 1.2 nm. Such a temperature-induced wavelength shift is normally insignificant for conventional BTF WDMs due to the large separation between channels or wavelength peaks, i.e., 50 nm or more.

However, in fused-fiber DWDMs, the signal light (for example, within the operation bandwidth of Er-doped fiber amplifiers) might be divided into multiple wavelengths for multi-channel transmission, i.e., 8 or more different channels. Co-owned U.S. patent app. Ser. No. 08/799,582, entitled "Apparatus and Method of Making a Fused Dense Wavelength Division Multiplexer", filed on Feb. 12, 1997, now U.S. Pat. No. 5,809,190, which is incorporated herein by reference in its entirety, discloses a method of increasing the number of channels in DWDMs. Because the usable wavelength bandwidth of the amplifiers is limited (e.g., light at 1550 nm has a usable bandwidth of approximately 20 to 30 nm), the channel spacing decreases as the number of channels increases. For example, with a 32-channel DWDM, the channel spacing is only ~0.8 nm, and thus a potential temperature-induced 1.2 nm wavelength shift can pose significant problems for a fused-fiber DWDM.

The transmission curve of FIG. 4A also exhibits a slower modulating envelope resulting from polarization mode interference. Because the fused-fiber in the coupling region is birefringent, i.e., the phase velocity of the light propagating through the coupling region is dependent on the direction of polarization of the light, losses due to polarization are maximum in the lowest parts 45 of the modulation envelope and minimum in the highest parts 43 and 44 of the modulation envelope.

Figure 4B:
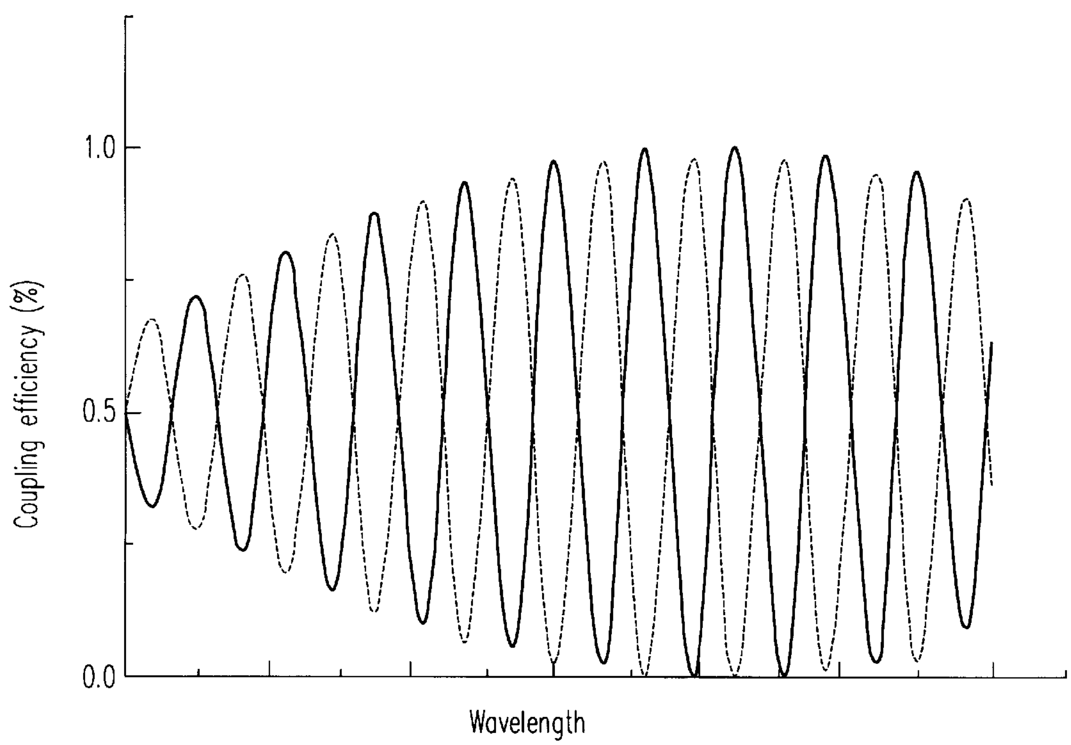
FIG. 4B is a graph of a typical spectrum of the output light from a WDM with optimum phase matching (OPM)
Figure 5:
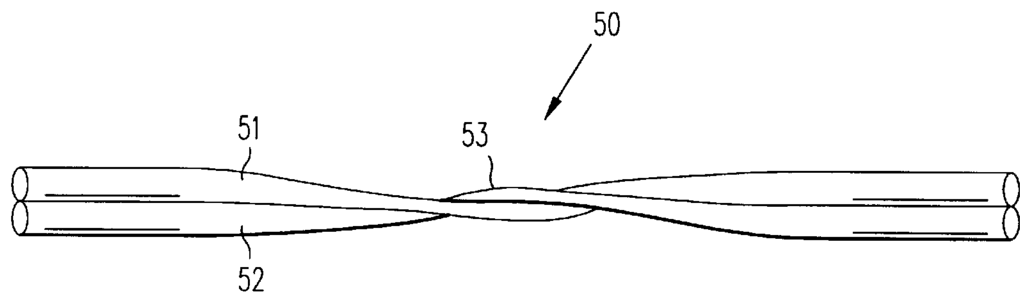
FIG. 5 is a diagram of a DWDM according to one embodiment of the present invention utilizing OPM.

In one embodiment of the present invention, shown in FIG. 5, a DWDM 50 utilizes optimum phase matching (OPM) to minimize the effects of birefringence. For OPM, a $2\pi$ phase difference exists between two orthogonally polarized lights. An optimum phase match is then obtained by twisting the pair of optic fibers 51 and 52 a few turns along coupling region 53 before or after the fusion process. Typically, a range of 0 to 2 turns is sufficient to achieve an OPM, depending on the length of the fused coupling region and the wavelengths of the incoming light. By utilizing optimum phase match, a wider modulation envelope and more pass bands of approximately equal amplitude (typically 5 or more) are possible, as shown in FIG. 4B.

Figure 6A:
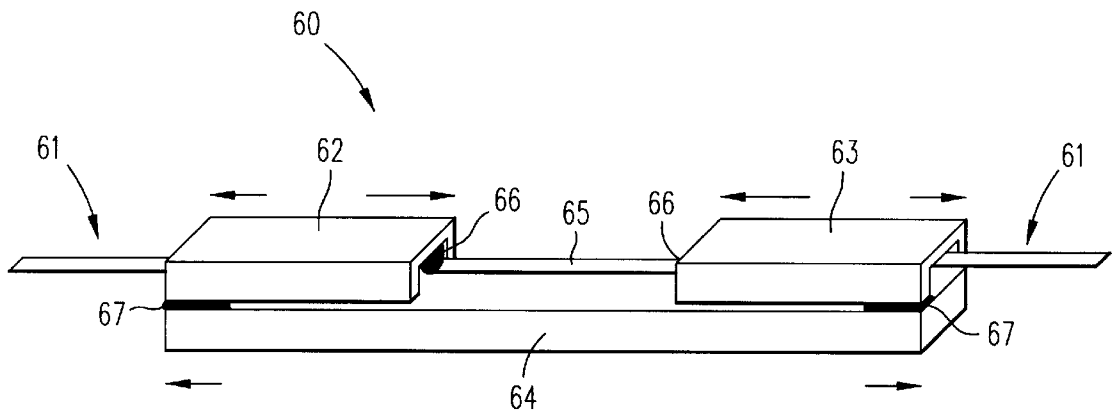
FIG. 6A is a diagram of a DWDM according to one embodiment of the present invention utilizing passive thermal compensation.
Figure 6B:
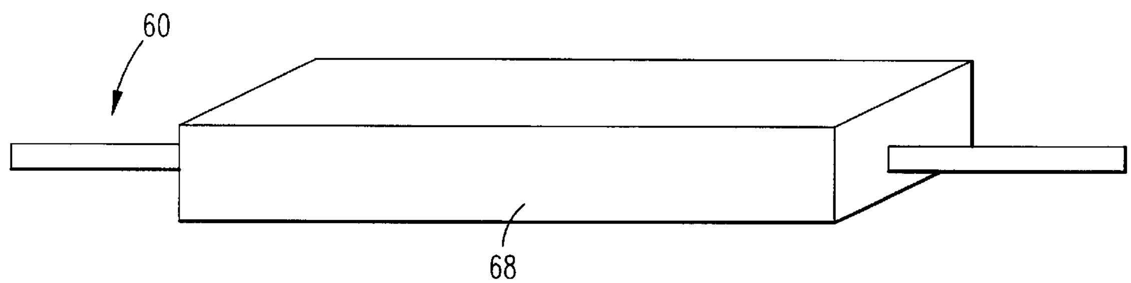
FIG. 6B is a diagram of the DWDM of FIG. 6A enclosed in a protective package.

FIG. 6A shows one embodiment according to the present invention for compensating for temperature-induced wavelength shifts in a DWDM. A composite structure 60 is formed by first mounting a fused-fiber DWDM 61 on a first substrate 62 and a second substrate 63, both made of materials with high thermal expansion coefficients, such as steel or aluminum. Substrates 62 and 63 are mounted onto a third substrate 64, made of a material with a lower thermal expansion coefficient than substrates 62 and 63, such as quartz or invar. Tension is applied to the fused coupling region 65 of DWDM 61, which is then placed between the inner ends of substrates 62 and 63 and secured thereon at mounting points 66 by epoxy or other suitable means, such as soldering, laser welding, or clamps. The amount of tension applied is determined based on the refractive index change of the fibers and the thermal expansion coefficients of substrates 62–64. Epoxy or other suitable means is also used to secure substrates 62 and 63 with substrate 64 at mounting points 67. Composite structure 60 can then be placed in a protective housing 68, as shown in FIG. 6B.

Figure 7A:
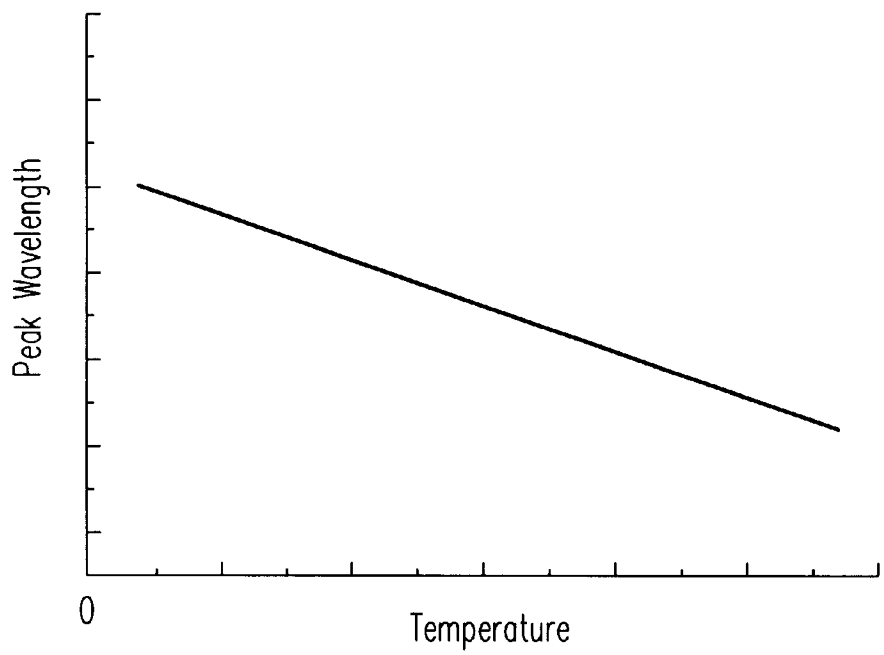
FIGS. 7A are 7B are graphs showing wavelength dependencies on temperature and tension, respectively.

Composite structure 60 minimizes temperature-induced wavelength drifts by using passive thermal compensation (PTC). Due to the refractive index increase of the fused-fiber, the pass band or peak wavelength of the fused-fiber DWDM is shifted towards shorter wavelengths as temperature rises, as shown in FIG. 7A. Concurrently, substrates 62–64 of FIG. 6A extend their lengths in accordance with their respective thermal expansion coefficients. As a result, substrates 62 and 63 expand more than substrate 64 due to the higher thermal expansion coefficients of substrates 62 and 63 (as shown by the size of the arrows in FIG. 6A). Because substrates 62 and 63 are secured to substrate 64 at mounting points 67, the distance between the two mounting points 66 decreases. Equivalently, the length of fused coupling region 65 between mounting points 66 is shortened as temperature rises so that, in effect, the substrate made of substrates 62–64 acts as one with a negative thermal expansion coefficient.

Figure 7B:
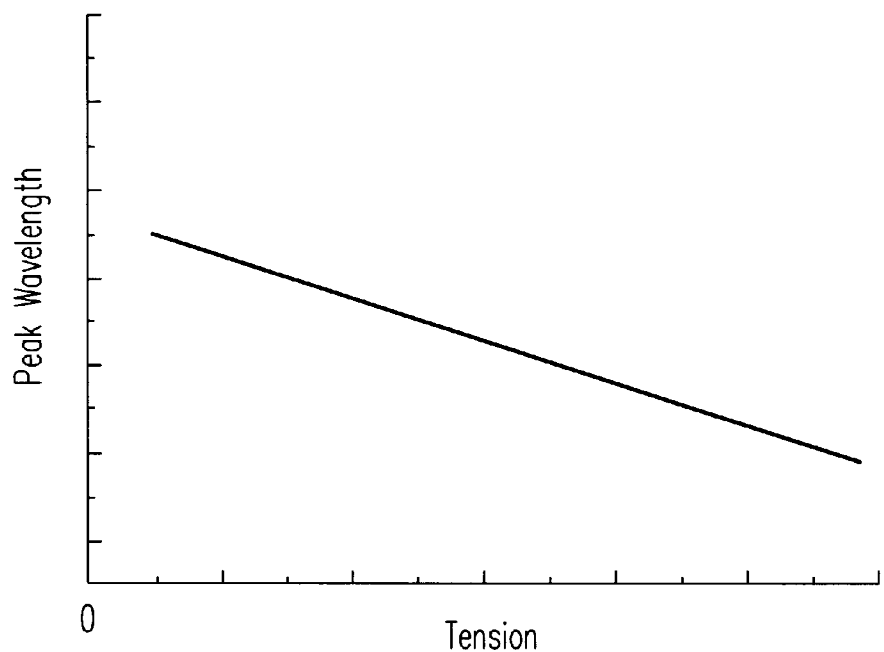

As the distance between mounting points 66 decreases, the tension on fused portion 65 is reduced, which shifts the pass band or peak wavelength towards longer wavelengths, as shown in FIG. 7B, because the refractive index of silica fibers also has a positive tension dependence. Therefore, decreases in wavelength due to a rise in temperature are compensated for by simultaneously increasing the wavelength as a result of a reduction in tension. Similarly, when temperature falls, substrates 62 and 63 contract more than substrate 64, thereby increasing the tension on fused portion 65 and compensating for wavelength shifts due to a temperature decrease. As a result, the problem of temperature-induced wavelength shifts is minimized with small, inexpensive, and simple composite DWDMs utilizing passive thermal compensation.

By adjusting the amount of compensation provided by the DWDM, the wavelength along the fused portion of the DWDM can be kept relatively constant throughout the range of operating temperatures. In the present embodiment, the amount of compensation can be easily changed by moving mounting points 67 at which substrates 62 and 63 are joined to substrate 64, with the amount of compensation increasing as mounting points 67 are placed closer to the ends of substrate 62 (and/or substrate 63) and substrate 64. The amount of compensation can also be changed by moving mounting points 66 at which DWDM 61 connects to substrates 62 and 63, with compensation increasing as mounting points 66 are moved closer together. It should also be noted that the pass band or wavelength peak can be adjusted by changing the tension to fused portion 65 before securing DWDM 61 to substrates 62 and 63, i.e., increasing tension moves the pass band to shorter wavelengths and decreasing tension moves the pass band to longer wavelengths. The amount of tension cannot be increased such that the multiplexer breaks at the lower limit of operating temperatures due to the contraction of substrates 62 and 63; while the amount of tension should not be decreased to the point that tension reaches zero prior to the upper limit of the operating temperatures from the expansion of substrates 62 and 63.

Thus, the present invention provides a method and structure for fused-fiber DWDMs which minimizes the problematic effects of temperature-induced wavelength shifts in DWDM. Consequently, using DWDMs of the present invention, channel spacings of less than 7 nm, i.e., at 0.8 nm, 1.6 nm, 3.2 nm, or 6.4 nm, are possible at wavelengths around 1550 nm. Furthermore, channel spacings of less than 7 nm are also possible at wavelengths in the ranges of 900–1200 nm and 1200–1400 nm. In addition, the embodiment shown in FIG. 6A allows both the tension and amount of compensation to be easily changed or adjusted by simply changing the location of mounting points between substrates 62 and 63 and substrate 64 and/or between substrates 62 and 63 and DWDM 61.

Figure 8A:
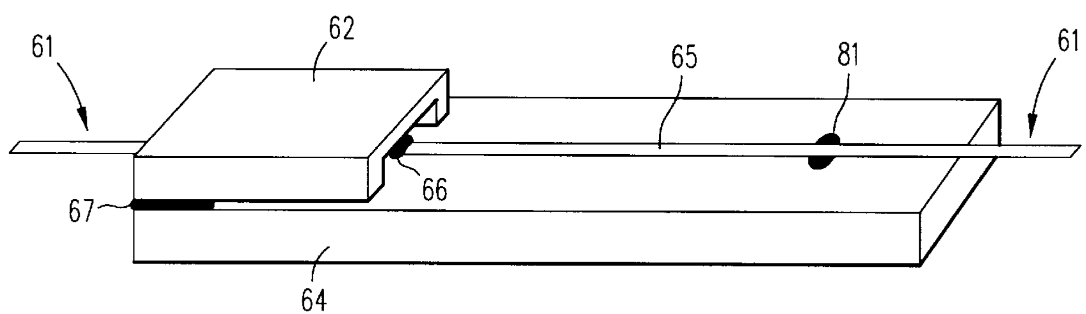
FIGS. 8A, 8B, 9A, 9B and 10–13 are diagrams of DWDM devices according to other embodiments of the present invention.
Figure 8B:
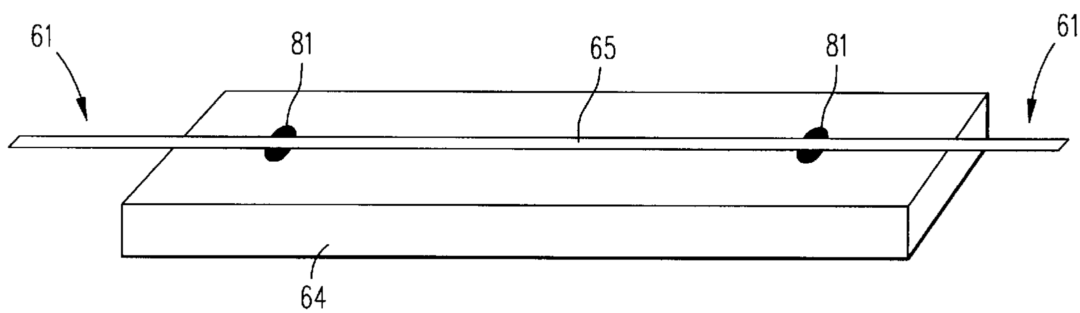

It will also be appreciated by those skilled in the art that substrates 62 or 63 can have the same or different thermal expansion coefficients as long as the thermal expansion coefficients of both substrates 62 and 63 together are relatively higher than the thermal expansion coefficient of substrate 64. Furthermore, one or both of substrates 62 and 63 can be replaced by epoxy or other securing material having a higher thermal expansion coefficient than substrate 64 to connect one or both end portions of fused coupling region 65 directly to substrate 64, as shown in FIGS. 8A and 8B, respectively. In all cases, the composite structure of the substrates must provide enough negative thermal expansion between mounting points 81 to adequately compensate for wavelength shifts in the range of operating temperatures.

In addition to movement in the horizontal direction to change length, substrates 62–64 in FIG. 6A also move in the vertical direction to change thickness in response to temperature changes. Thus, if substrates 62 and 63 have a different thickness or are made of different materials, the relative vertical separation between substrates 62 and 63 will also change. Consequently, the vertical separation between mounting points 66 changes with temperature, thereby altering the tension of fused coupler region 65. Therefore, the degree of wavelength compensation can be adjusted by changing the relative thicknesses and/or thermal expansion coefficients of substrates 62 and 63 to change the angle between fused coupling region 65 and substrates 62 and 63 along the direction of vertical movement.

In other embodiments of the present invention, passive thermal compensation can be achieved with pre-existing fused-fiber DWDMs and packages, thereby potentially reducing costs, time, and complexity. In one set of embodiments, shown in FIGS. 9–11, tension is first applied to the coupling region of fused-fiber DWDM 61, and then DWDM 61 is secured to a protective substrate 90, such as the sleeve shown in FIG. 2. Substrate 90 is connected to a structure which bends substrate 90 as temperature increases, thereby releasing tension in DWDM 61 for PTC. In another set of embodiments, shown in FIGS. 12–13, tension is applied to the coupling region after DWDM 61 is secured to substrate 90. In these embodiments, substrate 90 is first bent to provide tension within the coupling region of DWDM 61, and then the bent substrate is attached to a structure which unbends substrate 90 as temperature increases to provide the desired PTC.

Figure 9A:
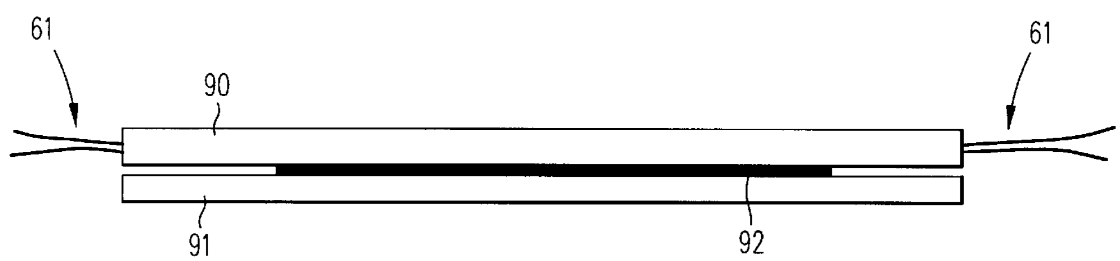
Figure 9B:
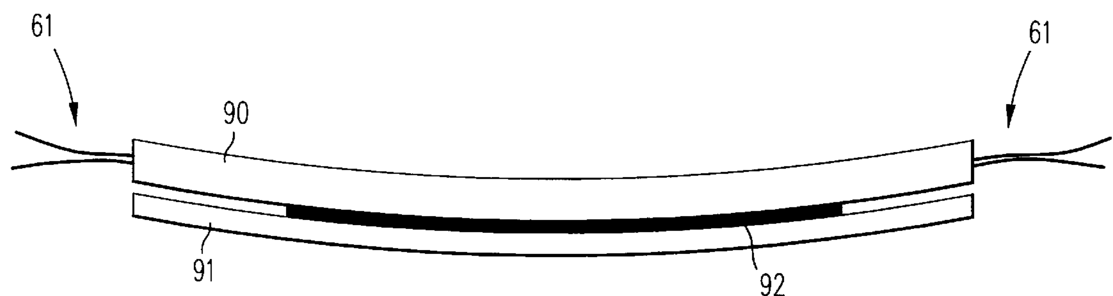

In FIG. 9A, substrate 90 is attached lengthwise to a second substrate 91 at mounting point 92 by an epoxy or any suitable connection means. Substrate 91 can be attached to either the upper or lower face of substrate 90 having a lower thermal expansion coefficient than substrate 91. As temperature rises, substrate 91 expands more than substrate 90, causing the ends of both substrates 90 and 91 to bend, as shown in FIG. 9B, which releases some of the tension in the coupling region of DWDM 61 to provide the desired PTC. The amount of compensation can be adjusted by varying the length over which substrates 90 and 91 are connected. Increasing the length of substrate 90 that is attached to substrate 91 increases the amount of temperature compensation available.

Figure 10:
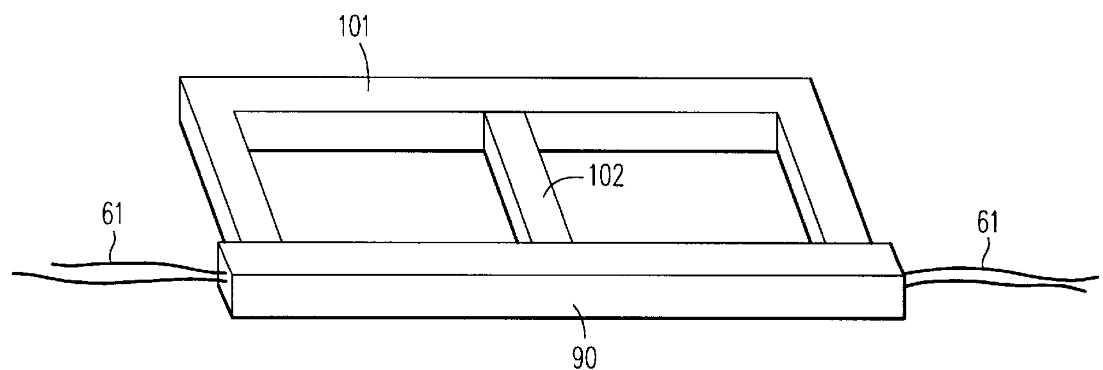
Figure 11:
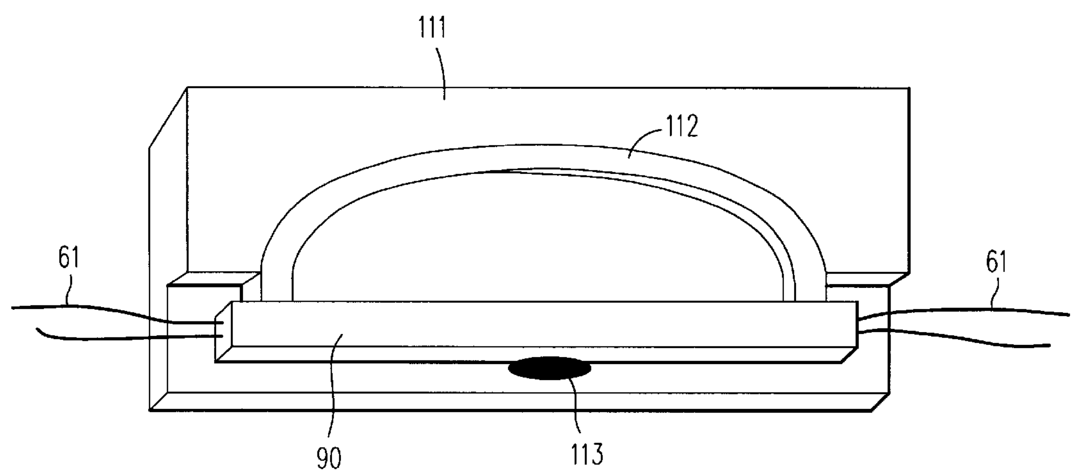

In FIG. 10, substrate 90, preferably square or rectangular shaped, is attached at its ends to the ends of a U-shaped substrate 101 and at its middle to one end of a substrate 102, which has its other end attached to a middle portion of substrate 101. Substrate 102 has a higher thermal expansion coefficient than substrate 101. Therefore, as temperature increases, substrate 102 expands more than substrate 101, which bends substrate 90 and releases tension from DWDM 61 to provide PTC. In FIG. 11, substrate 90, again preferably square or rectangular shaped, is attached at its middle to a substrate 111 at point 113 and at its ends to a substrate 112 having a higher thermal expansion coefficient than substrate 111. Substrate 112 is positioned against substrate 111 such that when temperature increases, substrate 112 expands to bend substrate 90 and lessen tension in DWDM 61.

Figure 12:
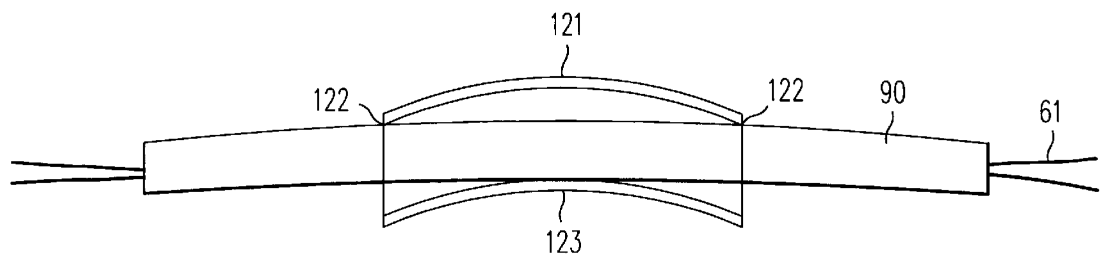

FIG. 12 shows an embodiment of the present invention, where no tension is applied to DWDM 61 prior to placement within protective substrate 90. Substrate 90 is bent to provide tension within the fused coupling region of DWDM 61 and then inserted in a curved substrate 121, such as the steel tube shown in FIG. 12. The curvature of substrate 121 must be more than that of substrate 90 to keep substrate 90 bent once substrate 90 is inserted into substrate 121. Thus, tight contact is maintained at outer points 122 and a middle point 123. Substrate 121 also has a higher thermal expansion coefficient than substrate 90 so that when temperature increases, substrate 121 expands more than substrate 90, thereby releasing the bending of substrate 90, which relieves the tension of DWDM 61 to provide PTC.

Figure 13:
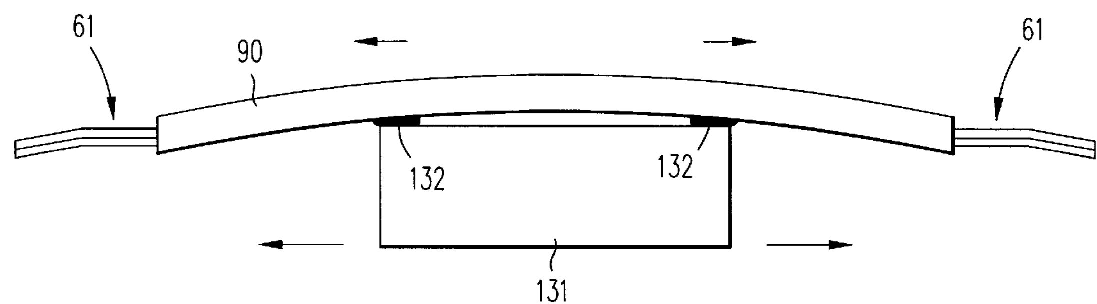

In FIG. 13, an embodiment is shown utilizing a concept similar to that described with respect to the embodiment of FIG. 12. Substrate 90 is bent to provide tension to the fused portion of DWDM 61 and then secured at the ends of the upper surface of a substrate 131 at mounting points 132 by epoxy or other suitable means to maintain the tension. Substrate 131 has a higher thermal expansion coefficient than substrate 90. Therefore, as temperature rises, substrate 131 expands more rapidly than substrate 90, which unbends substrate 90 and releases tension in DWDM 61, as indicated by the relative sizes of the arrows in FIG. 13. Similarly, as temperature decreases, substrate 131 contracts more rapidly to create additional tension in the fused portion of DWDM 61 by bending substrate 90 and DWDM 61. This bending and unbending compensates for the temperature effects on wavelength shifting. The amount of compensation can be varied by changing the relative lengths of substrates 90 and 131, where lengthening substrate 131 relative to substrate 90 increases the amount of temperature compensation.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

I claim:

1. A fused-fiber dense wavelength division multiplexer (DWDM) device, comprising:

a first substrate having a first thermal expansion coefficient;

a fused-fiber DWDM connected to said first substrate, wherein the fused-fiber portion of said DWDM is under tension; and a second substrate connected to said first substrate and having a second thermal expansion coefficient, wherein said tension is reduced when temperature rises and is increased when temperature falls to provide passive thermal compensation.

2. The device of claim 1, wherein said DWDM is further connected to said second substrate.

3. The device of claim 1, further comprising a third substrate having a third thermal expansion coefficient and connected to said DWDM and to said second substrate.

4. The device of claim 3, wherein said first and third thermal expansion coefficients are equal.

5. The device of claim 3, wherein the fused-fiber portion of said DWDM is connected between said first and third substrates.

6. The device of claim 3, wherein said tension is applied before said DWDM is connected to said first and third substrates.

7. The device of claim 1, further comprising a package enclosing said first substrate and said DWDM.

8. The device of claim 3, wherein said first thermal expansion coefficient is higher than said second thermal expansion coefficient.

9. The device of claim 1, wherein said DWDM has a channel spacing of less than 7 nm at wavelengths around 1550 nm.

10. The device of claim 1, wherein said DWDM has a channel spacing of less than 7 nm at wavelengths between 1200 and 1400 nm.

11. The device of claim 1, wherein said DWDM has a channel spacing of less than 7 nm at wavelengths between 900 and 1200 nm.

12. The device of claim 1, wherein the fused-fiber portion of said DWDM is formed by twisting said fused-fiber portion to obtain an optimum phase matching condition.

13. The device of claim 12, wherein the fused-fiber portion of said DWDM is twisted 0 to 2 turns.

14. The device of claim 1, wherein said tension is applied before said DWDM is connected to said first substrate.

15. The device of claim 14, wherein the fused-fiber portion of said DWDM is enclosed by said first substrate.

16. The device of claim 14, wherein said first and second substrates are approximately the same length.

17. The device of claim 1, wherein the amount of thermal compensation depends on the length of said first and second substrates over which said first and second substrates are connected.

18. The device of claim 14, wherein said first thermal expansion coefficient is lower than said second thermal expansion coefficient.

19. The device of claim 14, further comprising a third substrate having a third thermal expansion coefficient higher than said second thermal expansion coefficient and connected to said first and second substrates.

20. The device of claim 19, wherein said third substrate expands to force the middle portion of said first substrate to bend when temperature increases.

21. The device of claim 19, wherein said third substrate expands to force the end portions of said first substrate to bend when temperature increases.

22. The device of claim 1, wherein the fused-fiber portion of said DWDM is enclosed by said first substrate.

23. The device of claim 22, wherein said tension is applied after said DWDM is connected to said first substrate by bending said first substrate.

24. The device of claim 23, wherein said first substrate is connected to the ends of a surface of said second substrate.

25. A fused-fiber dense wavelength division multiplexer (DWDM) device, comprising:

a first substrate having a first thermal expansion coefficient;

a fused-fiber DWDM connected to said first substrate, wherein the fused-fiber portion of said DWDM is under tension and enclosed by said first substrate; and a second substrate surrounding said first substrate and having a second thermal expansion coefficient, wherein said tension is reduced when temperature rises and is increased when temperature falls to provide passive thermal compensation.

26. The device of claim 25, wherein said second substrate is bent more than said first substrate.

27. A method of providing thermal compensation to a fused-fiber dense wavelength division multiplexer (DWDM), comprising the steps of:

applying tension to the fused-fiber portion of said DWDM;

connecting said DWDM to a first substrate having a first thermal expansion coefficient; and connecting a second substrate having a second thermal expansion coefficient, wherein said tension is reduced when temperature rises and is increased when temperature falls to provide passive thermal compensation.

28. The method of claim 27, further comprising the step of connecting a third substrate having a third thermal expansion coefficient to said DWDM and to said second substrate.

29. The method of claim 27, further comprising the step of connecting said DWDM to said second substrate.

30. The method of claim 27, wherein said first thermal expansion coefficient is higher than said second thermal expansion coefficient.

31. The method of claim 27, wherein the amount of thermal compensation depends on the length of said first and second substrates where said first and second substrates are connected.

32. The method of claim 27, further comprising the step of twisting the fused-fiber portion of said DWDM to obtain a optimum phase matching condition.

33. The method of claim 27, further comprising the step of enclosing the fused-fiber portion of said DWDM within said first substrate.

34. The method of claim 33, further comprising the step of connecting a third substrate having a third thermal expansion coefficient to said second substrate and to a middle portion of said first substrate to bend the middle portion when temperature increases.

35. The method of claim 33, further comprising the step of connecting a third substrate having a third thermal expansion coefficient to said second substrate and to end portions of said first substrate to bend the end portions when temperature increases.

36. A method of providing thermal compensation to a fused-fiber dense wavelength division multiplexer (DWDM), comprising the steps of:

connecting said DWDM to a first substrate having a first thermal expansion coefficient and enclosing the fused-fiber portion of said DWDM within said first substrate;

applying tension to the fused portion of said DWDM by bending said first substrate; and connecting a second substrate having a second thermal expansion coefficient to said first substrate, wherein said tension is reduced when temperature rises and is increased when temperature falls to provide passive thermal compensation.

37. The method of claim 36, wherein said first substrate is connected to the ends of a surface of said second substrate.

38. The method of claim 36, wherein said first thermal expansion coefficient is lower than said second expansion coefficient.

39. A method of providing thermal compensation to a fused-fiber dense wavelength division multiplexer (DWDM), comprising the steps of:

connecting said DWDM to a first substrate having a first thermal expansion coefficient and enclosing the fused-fiber portion of said DWDM within said first substrate;

applying tension to the fused portion of said DWDM by bending said first substrate; and inserting said first substrate into a second substrate having a second thermal expansion coefficient, wherein said tension is reduced when temperature rises and is increased when temperature falls to provide passive thermal compensation.

40. The method of claim 39, wherein said second substrate is bent more than said first substrate.

* * * * *